United States Patent
Chin et al.

(10) Patent No.: US 9,125,043 B2
(45) Date of Patent: *Sep. 1, 2015

(54) METHOD AND APPARATUS FOR EFFICIENT IDLE OPERATION IN A DUAL-SIM WCDMA MOBILE STATION

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/903,034

(22) Filed: Oct. 12, 2010

(65) Prior Publication Data

US 2012/0088502 A1    Apr. 12, 2012

(51) Int. Cl.
*H04W 68/00* (2009.01)
*H04W 8/26* (2009.01)
*H04W 52/02* (2009.01)

(52) U.S. Cl.
CPC ............ *H04W 8/26* (2013.01); *H04W 52/0216* (2013.01); *H04W 68/00* (2013.01); *Y02B 60/50* (2013.01)

(58) Field of Classification Search
CPC ... H04W 68/00; H04W 86/02; H04W 68/005; H04W 88/02; H04W 88/06
USPC ............... 455/458, 425, 426.1, 574; 370/311, 370/312, 314, 320, 335, 342
See application file for complete search history.

(56) References Cited

U.S. PATENT DOCUMENTS

| | | | |
|---|---|---|---|
| 5,392,287 A | 2/1995 | Tiedemann, Jr. et al. | |
| 5,509,015 A | 4/1996 | Tiedemann, Jr. et al. | |
| 8,615,227 B2 | 12/2013 | Su et al. | |
| 8,682,357 B2 * | 3/2014 | Worrall | 455/458 |
| 8,825,091 B2 * | 9/2014 | Lee et al. | 455/458 |
| 2003/0125073 A1 * | 7/2003 | Tsai et al. | 455/552 |
| 2004/0023672 A1 * | 2/2004 | Terry | 455/458 |
| 2007/0161384 A1 * | 7/2007 | Terry | 455/458 |
| 2008/0090594 A1 * | 4/2008 | Butler et al. | 455/458 |
| 2008/0182596 A1 | 7/2008 | Wang et al. | |
| 2008/0280644 A1 | 11/2008 | Hugot | |
| 2009/0131054 A1 * | 5/2009 | Zhang | 455/436 |
| 2009/0215472 A1 * | 8/2009 | Hsu | 455/458 |
| 2009/0258661 A1 | 10/2009 | Tsai | |

(Continued)

OTHER PUBLICATIONS

3GPP TS 25.304 V9.2.0 "User Equipment (UE) procedures in idle mode and procedures for cell reselection in connected mode", release 9, Jun. 2010.*

(Continued)

*Primary Examiner* — Madgi Elhag
(74) *Attorney, Agent, or Firm* — Kristine U. Ekwueme

(57) ABSTRACT

Methods and apparatus are provided for selecting identifying numbers associated with a mobile station (MS) having multiple subscriber identity modules (SIMs) such that the paging intervals for both identifying numbers are aligned. The MS having multiple SIMs may operate in a network via a particular radio access technology (RAT), such as Wideband Code Division Multiple Access (W-CDMA). By having aligned paging intervals, the MS may wake up only once during the paging cycles for the various identifying numbers rather than waking up multiple times, thereby reducing power consumption of the MS during idle mode compared to a conventional MS with multiple SIMs, and thus multiple identifying numbers.

39 Claims, 5 Drawing Sheets

(56) References Cited

U.S. PATENT DOCUMENTS

| | | | |
|---|---|---|---|
| 2009/0305728 A1* | 12/2009 | Huang et al. | 455/458 |
| 2010/0128699 A1* | 5/2010 | Yang et al. | 370/335 |
| 2010/0203906 A1* | 8/2010 | Fang et al. | 455/458 |
| 2011/0244880 A1* | 10/2011 | Chin et al. | 455/456.1 |
| 2012/0027003 A1* | 2/2012 | Chin et al. | 370/342 |
| 2012/0040700 A1* | 2/2012 | Gomes et al. | 455/500 |
| 2012/0088501 A1 | 4/2012 | Chin et al. | |
| 2013/0316718 A1 | 11/2013 | Hsu et al. | |

OTHER PUBLICATIONS

International Search Report and Written Opinion—PCT/US2011/056027—ISA/EPO—Jan. 27, 2010.

* cited by examiner

METHOD AND APPARATUS FOR EFFICIENT IDLE OPERATION IN A DUAL-SIM WCDMA MOBILE STATION

CROSS-REFERENCE TO RELATED APPLICATION(S)

This application is related to Ser. No. 12/903,033, entitled "Method and Apparatus for Efficient Idle Operation in a Dual-SIM CDMA 1× Mobile Station," filed concurrently herewith, which is expressly incorporated by reference herein in its entirety.

BACKGROUND

1. Field

Certain aspects of the present disclosure generally relate to wireless communications and, more particularly, to selecting identifying numbers associated with a mobile station (MS) having multiple subscriber identity modules (SIMs) such that the paging slots for both identifying numbers are aligned in an effort to reduce power consumption during an idle mode.

2. Background

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System—Time Division Duplexing), HSPA (High Speed Packet Access), GPRS (General Packet Radio Service), and EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems.

A wireless communication network may include a number of base stations that can support communication for a number of mobile stations. A mobile station (MS) may communicate with a base station (BS) via the downlink and uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

As mentioned above, W-CDMA is one type of 3G RAT that may be used in providing network service. As the most commonly used member of the Universal Mobile Telecommunications System (UMTS) family of technologies, W-CDMA is often used as a synonym for UMTS. Transmitting on a pair of 5 MHz-wide channels, W-CDMA employs the Direct-Sequence CDMA (DS-CDMA) channel access method and the frequency-division duplexing (FDD) technique to deliver higher speeds and support more users compared to most time division multiple access (TDMA) schemes currently in use.

SUMMARY

In an aspect of the disclosure, a method for communicating in a radio access technology (RAT) network is provided. The method generally includes providing a first identifying number associated with a user equipment device (UE), selecting a second identifying number such that a first paging interval for the first identifying number is aligned with a second paging interval for the second identifying number, and associating the second identifying number with the UE, wherein the RAT comprises Universal Mobile Telecommunications System (UMTS).

In an aspect of the disclosure, an apparatus for communicating in a network via a RAT is provided. The apparatus generally includes means for providing a first identifying number associated with a UE, means for selecting a second identifying number such that a first paging interval for the first identifying number is aligned with a second paging interval for the second identifying number, and means for associating the second identifying number with the UE, wherein the RAT comprises UMTS.

In an aspect of the disclosure, an apparatus for communicating in a network via a RAT is provided. The apparatus generally includes at least one processor and a memory coupled to the at least one processor. The at least one processor is typically configured to provide a first identifying number associated with a UE, to select a second identifying number such that a first paging interval for the first identifying number is aligned with a second paging interval for the second identifying number, and to associate the second identifying number with the UE, wherein the RAT comprises UMTS.

In an aspect of the disclosure, a computer-program product for communicating in a network via a RAT is provided. The computer-program product generally includes a computer-readable medium having code for providing a first identifying number associated with a UE, for selecting a second identifying number such that a first paging interval for the first identifying number is aligned with a second paging interval for the second identifying number, and for associating the second identifying number with the UE, wherein the RAT comprises UMTS.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 7 illustrates the paging intervals for two different IMSIs in a single UE being completely aligned, in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Wireless Communication System

The methods and apparatus of the present disclosure may be utilized in a broadband wireless communication system. The term "broadband wireless" refers to technology that provides wireless, voice, Internet, and/or data network access over a given area. The various concepts presented throughout this disclosure may be implemented across a broad variety of telecommunication systems, network architectures, and communication standards. By way of example and without limitation, the aspects of the present disclosure illustrated in FIG. 1 are presented mainly with reference to a W-CDMA system.

Figure 1:
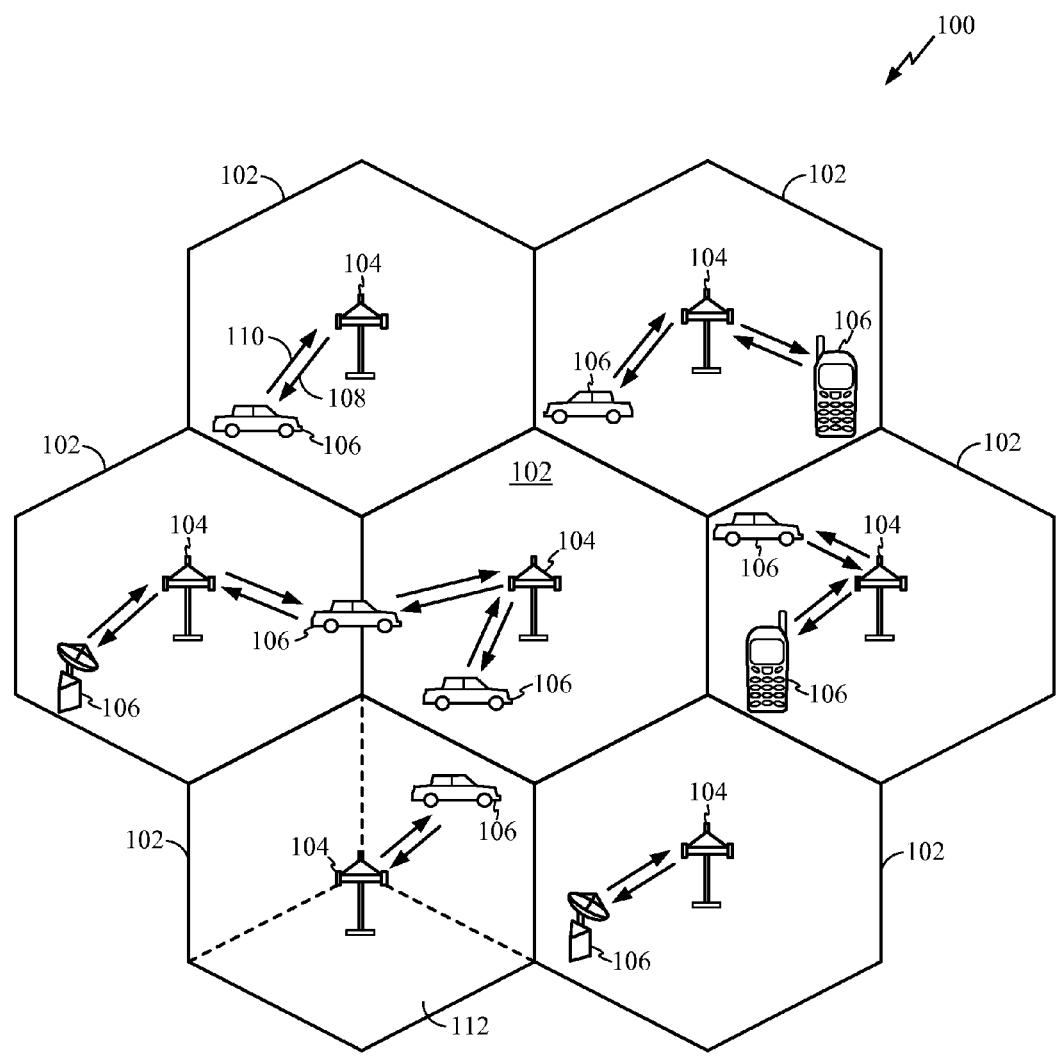
FIG. 1 is a block diagram conceptually illustrating an example of a wireless communication system in accordance with certain aspects of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station (BS) 104. A base station 104 may be a fixed station that communicates with mobile stations 106. The base station 104 may alternatively be referred to as a Node B, a base transceiver station (BTS), a radio base station, a radio transceiver, a transceiver function, a basic service set (BSS), an extended service set (ESS), an access point (AP), or some other suitable terminology.

FIG. 1 depicts various mobile stations 106 dispersed throughout the system 100. The mobile stations 106 may be fixed (i.e., stationary) or mobile. A mobile station (MS) 106 may alternatively be referred to by those skilled in the art as a user terminal, a remote station, a subscriber station, a station (STA), user equipment (UE), a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Examples of a mobile station 106 include a cellular phone, a smart phone, a session initiation protocol (SIP) phone, a laptop, a notebook, a netbook, a smartbook, a wireless modem, a personal digital assistant (PDA), a satellite radio, a global positioning system (GPS) device, a multimedia device, a video device, a digital audio player (e.g., MP3 player), a camera, a game console, a handheld device, or any other similar functioning device.

A variety of algorithms and methods may be used for transmissions in the wireless communication system 100 between the base stations 104 and the mobile stations 106. For example, signals may be sent and received between the base stations 104 and the mobile stations 106 in accordance with the W-CDMA techniques. In these cases, the wireless communication system 100 may be referred to as a W-CDMA system.

A communication link that facilitates transmission from a base station 104 to a mobile station 106 may be referred to as a downlink 108, and a communication link that facilitates transmission from a mobile station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
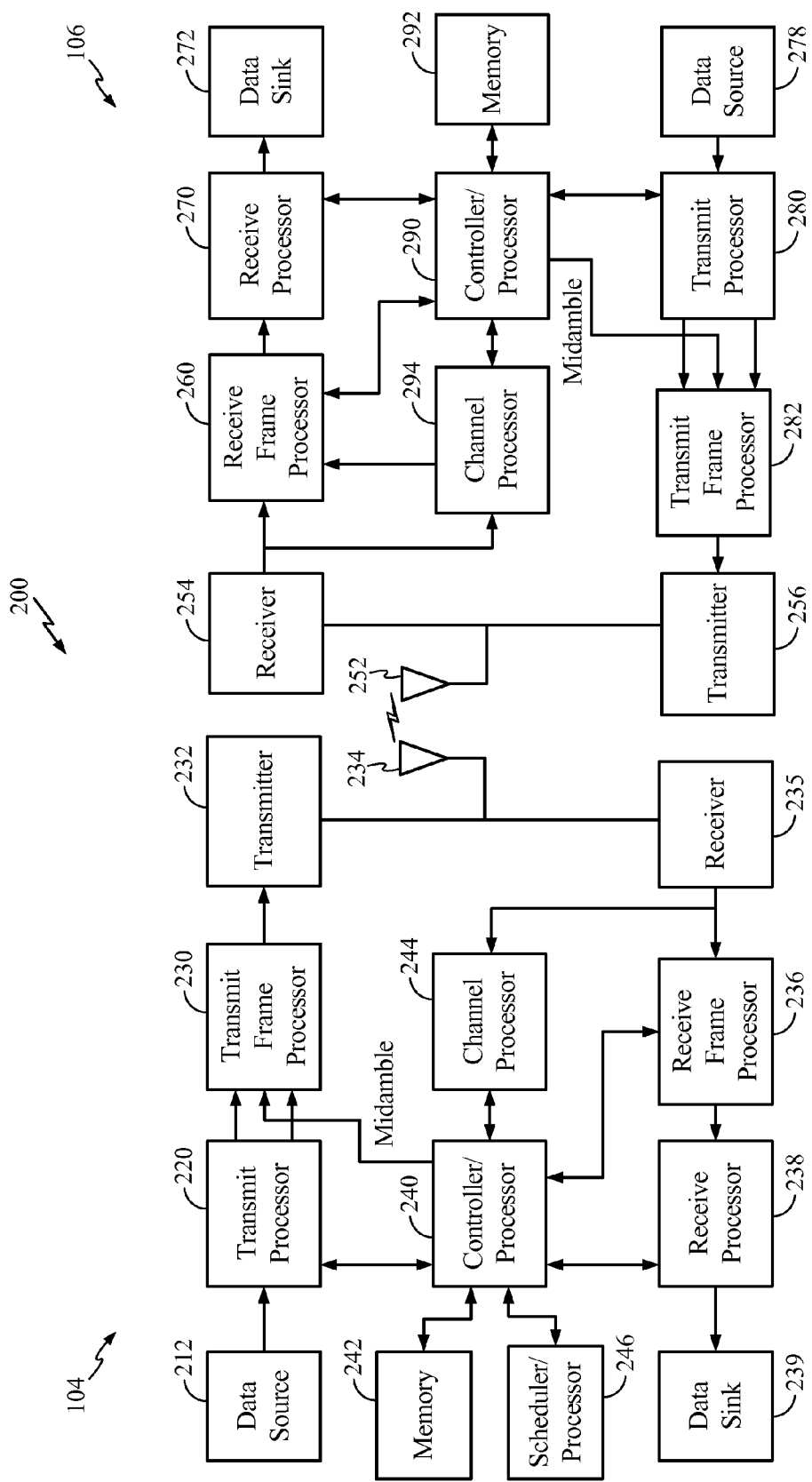
FIG. 2 is a block diagram conceptually illustrating an example of a base station (BS) in communication with a mobile station (MS) in a wireless communication system in accordance with certain aspects of the present disclosure.

FIG. 2 is a block diagram of a BS 104 in communication with a MS 106 in a network 200 operating according to a particular radio access technology (RAT). In the downlink communication, a transmit processor 220 may receive data from a data source 212 and control signals from a controller/processor 240. The transmit processor 220 provides various signal processing functions for the data and control signals, as well as reference signals (e.g., pilot signals). For example, the transmit processor 220 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 244 may be used by a controller/processor 240 to determine the coding, modulation, spreading, and/or scrambling schemes for the transmit processor 220. These channel estimates may be derived from a reference signal transmitted by the MS 106. The symbols generated by the transmit processor 220 are provided to a transmit frame processor 230 to create a frame structure. The frames are then provided to a transmitter 232, which provides various signal conditioning functions including amplifying, filtering, and modulating the frames onto a carrier for downlink transmission over the wireless medium through antennas 234. The antennas 234 may be implemented with beam steering bidirectional adaptive antenna arrays or other similar beam technologies.

At the MS 106, a receiver 254 receives the downlink transmission through an antenna 252 and processes the transmission to recover the information modulated onto the carrier. The information recovered by the receiver 254 is provided to a receive frame processor 260, which parses each frame, and may provides a portion to a channel processor 294 and the data, control, and reference signals to a receive processor 270. The receive processor 270 then performs the inverse of the processing performed by the transmit processor 220 in the BS 104. More specifically, the receive processor 270 descrambles and despreads the symbols, and then determines the most likely signal constellation points transmitted by the BS 104 based on the modulation scheme. These soft decisions may be based on channel estimates computed by the channel processor 294. The soft decisions are then decoded and deinterleaved to recover the data, control, and reference signals. The CRC codes are then checked to determine whether the frames were successfully decoded. The data carried by the successfully decoded frames will then be provided to a data sink 272, which represents applications running in the MS 106 and/or various user interfaces (e.g., display). Control signals carried by successfully decoded frames will be provided to a controller/processor 290. When frames are unsuccessfully decoded by the receiver processor 270, the controller/processor 290 may also use an acknowledgement (ACK) and/or negative acknowledgement (NACK) protocol to support retransmission requests for those frames.

In the uplink, data from a data source 278 and control signals from the controller/processor 290 are provided to a transmit processor 280. The data source 278 may represent applications running in the MS 106 and various user interfaces (e.g., keyboard). Similar to the functionality described in connection with the downlink transmission by the BS 104, the transmit processor 280 provides various signal processing functions including CRC codes, coding and interleaving to facilitate FEC, mapping to signal constellations, spreading with OVSFs, and scrambling to produce a series of symbols. Channel estimates, derived by the channel processor 294 from a reference signal transmitted by the BS 104, may be used to select the appropriate coding, modulation, spreading, and/or scrambling schemes. The symbols produced by the transmit processor 280 will be provided to a transmit frame processor 282 to create a frame structure. The frames are then provided to a transmitter 256, which provides various signal conditioning functions including amplification, filtering, and modulating the frames onto a carrier for uplink transmission over the wireless medium through the antenna 252.

The uplink transmission is processed at the BS 104 in a manner similar to that described in connection with the receiver function at the MS 106. A receiver 235 receives the uplink transmission through the antenna 234 and processes the transmission to recover the information modulated onto the carrier. The information recovered by the receiver 235 is provided to a receive frame processor 236, which parses each frame, and provides a portion to the channel processor 244 and the data, control, and reference signals to a receive processor 238. The receive processor 238 performs the inverse of the processing performed by the transmit processor 280 in the MS 106. The data and control signals carried by the successfully decoded frames may then be provided to a data sink 239 and the controller/processor, respectively. If some of the frames were unsuccessfully decoded by the receive processor, the controller/processor 240 may also use an acknowledgement (ACK) and/or negative acknowledgement (NACK) protocol to support retransmission requests for those frames.

The controller/processors 240 and 290 may be used to direct the operation at the BS 104 and the MS 106, respectively. For example, the controller/processors 240 and 290 may provide various functions including timing, peripheral interfaces, voltage regulation, power management, and other control functions. The computer-readable media of memories 242 and 292 may store data and software for the BS 104 and the MS 106, respectively. A scheduler/processor 246 at the BS 104 may be used to allocate resources to the MSs and schedule downlink and/or uplink transmissions for the MSs.

An Example Method of Efficient Idle Mode Operation in a Dual-SIM WCDMA Mobile Station In some countries, it is popular to operate a mobile station 106 with dual subscriber identity modules (SIMs). With two (or more) SIMs, a user can make and receive mobile calls with two (or more) different phone numbers due to a different International Mobile Subscriber Identity (IMSI) stored on each SIM.

Figure 3:
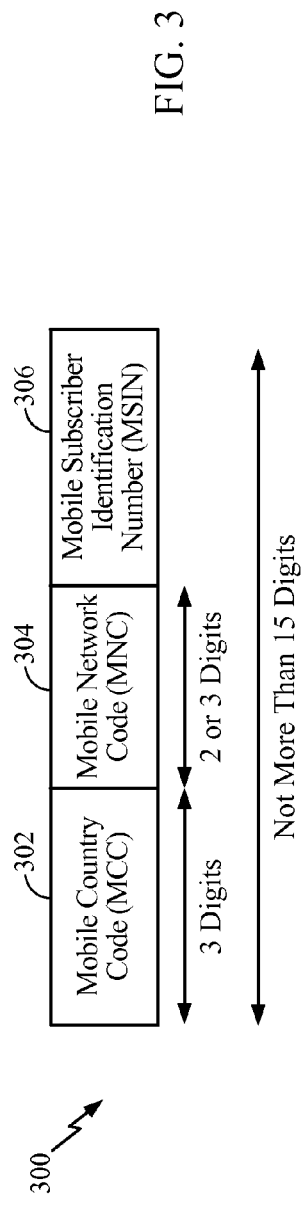
FIG. 3 illustrates various components of an International Mobile Subscriber Identifier (IMSI), in accordance with certain aspects of the present disclosure.

FIG. 3 illustrates various components of an IMSI 300, a unique number associated with the MS and used to identify the MS on the network. Typically composed of 15 digits, an IMSI may comprise 3 digits specifying the Mobile Country Code (MCC) 302, followed by either 2 (European standard) or 3 digits (North American standard) specifying the Mobile Network Code (MNC) 304. The remaining digits may comprise the mobile station identification number (MSIN) 306 within the network's customer base. For certain aspects, the MSIN 306 may be a phone number (i.e., a dialing telephone number) for the MS, while in other aspects, the MSIN 306 and the phone number may be dissimilar.

The IMSI may be encoded according to GSM-MAP. That is, the digits of the IMSI may be converted to binary bits. For example, two digits "12" may be encoded as 1100 in binary bits.

Figure 4:
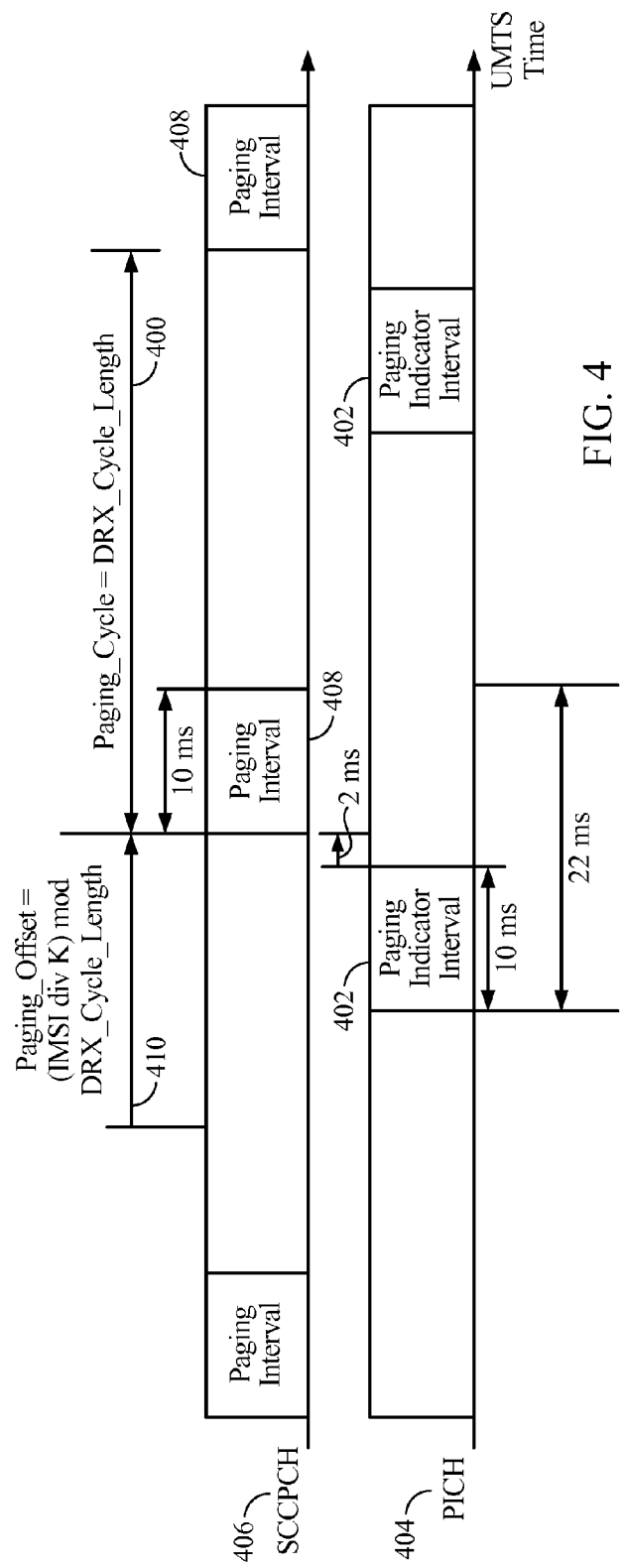
FIG. 4 illustrates various intervals affecting the timing of a Universal Mobile Telecommunications System (UMTS) paging cycle, in accordance with certain aspects of the present disclosure.

In UMTS (or W-CDMA), a MS (i.e., a user equipment device (UE)) in idle mode will listen to certain recurrent paging intervals. FIG. 4 illustrates various intervals affecting the timing of a UMTS paging cycle 400. The UE may start to monitor the paging indicator as long as there are 10 ms for a paging indicator interval 402 on the PICH (Paging Indication Channel) 404, 2 ms offset between the PICH and a SCCPCH (Secondary Common Control Physical Channel) 406, and 10 ms for a paging interval 408 on the SCCPCH during which the Paging Type 1 message is sent, for a total of 22 ms.

UMTS may allow different paging cycles 400 and paging offsets 410 whereby the paging message can be sent. The following equation determines the paging offset 410 based on a 10 ms radio frame number, i.e. the SFN (System Frame Number), where UMTS Node B can send the paging message to a UE:

$$\text{Paging\_Offset} = SFN \bmod \text{DRX\_Cycle\_Length} \quad (1)$$
$$= (IMSI \, div \, K) \bmod \text{DRX\_Cycle\_Length}$$

The DRX (Discontinuous Reception) Cycle Length may determine the length of the paging cycle 400. For circuit-switched (CS) service, the DRX Cycle Length may be decided by the core network to have one of the following values: $2^6$ (i.e., 640 ms), $2^7$, $2^8$, and $2^9$ (i.e., 5.12 sec). For packet-switched (PS) service, the DRX Cycle Length may be negotiated between the UE and the core network, using an Attach procedure, to have one of the following values: $2^3$ (i.e., 80 ms), $2^4$, $2^5$, $2^6$, $2^7$, $2^8$, and $2^9$ (i.e., 5.12 sec).

Once the DRX Cycle Length is determined, the paging offset 410 may be calculated, according to equation (1), by the quotient of the IMSI 300 divided by the parameter K. The parameter K is the number of SCCPCHs 406 that a base station 104 supports (i.e., the number of SCCPCHs 406 configured for a cell). The operator "div" in equation (1) as defined herein generally refers to the quotient of the division.

In general, a MS (or a UE) with dual SIMs or IMSIs may monitor paging messages according to different paging intervals 408 because the different IMSIs frequently lead to different SFNs according to equation (1). Consequently, if the UE has two IMSIs (e.g., two phone numbers), the UE may have to monitor for paging messages twice as long as a UE with only one IMSI (e.g., a single phone number).

Figure 5:
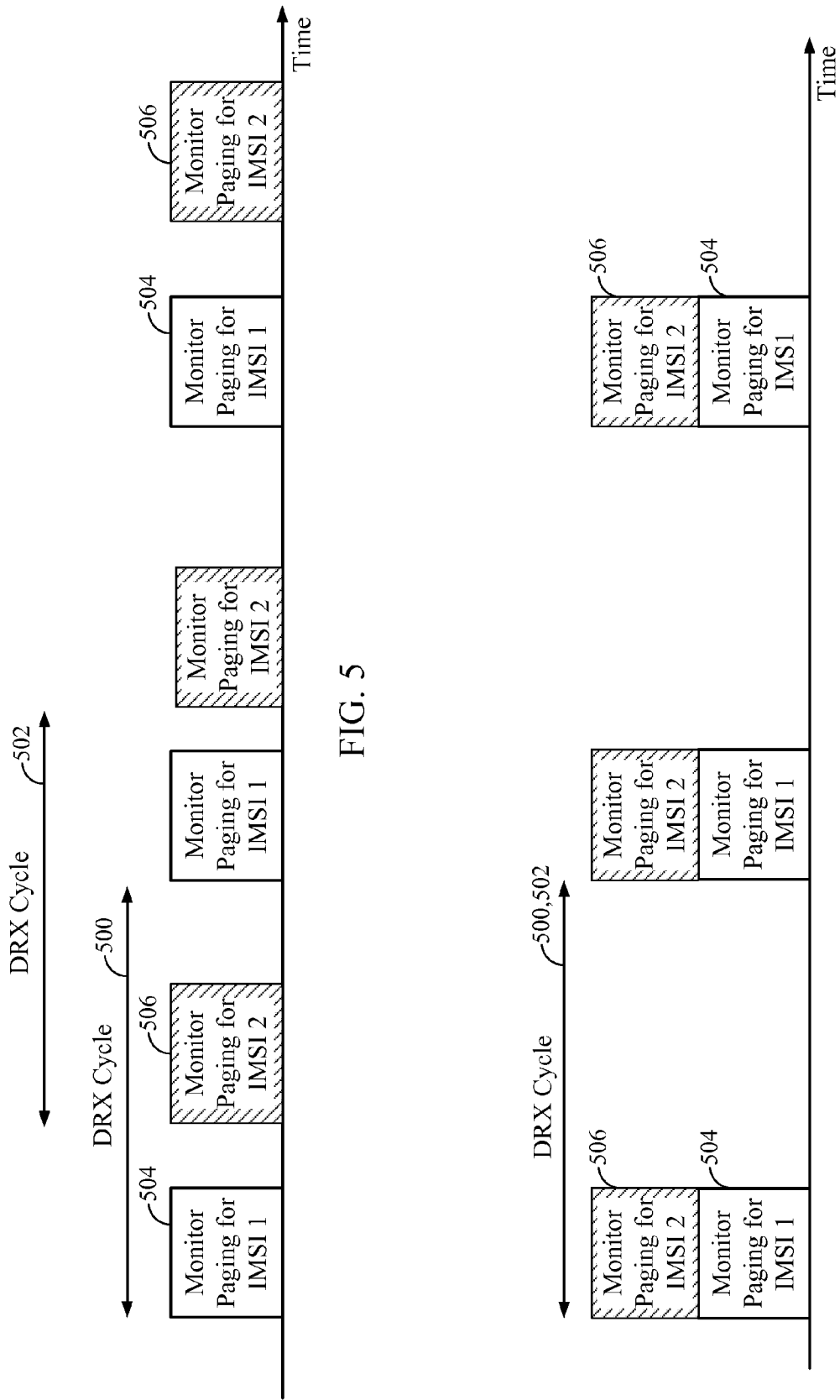
FIG. 5 illustrates the paging intervals for two different IMSIs in a single user equipment device (UE) being offset, in accordance with certain aspects of the present disclosure.

As an example, FIG. 5 illustrates a paging cycle 500 (i.e., a DRX cycle) for a first IMSI (IMSI 1) and a paging cycle 502 for a second IMSI (IMSI 2). In FIG. 5, the paging intervals 504 for IMSI 1 are offset from the paging intervals 506 for IMSI 2. Since in idle mode the UE may most likely wake up from the idle state during the paging intervals 504, 506 to listen for any paging messages, the power consumption of a UE with two IMSIs may be approximately double that of a UE with only a single IMSI during idle mode.

Accordingly, what is needed are techniques and apparatus for reducing the power consumption during idle mode for a UE with multiple IMSIs.

Figure 6:
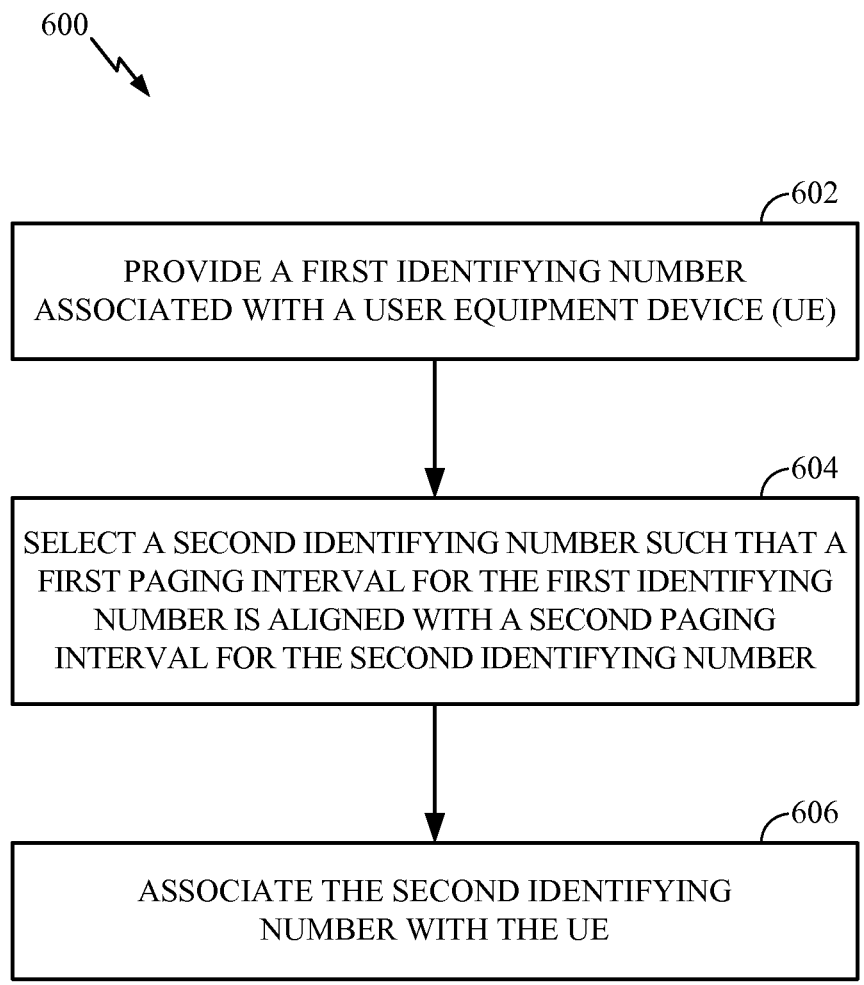
FIG. 6 is a functional block diagram conceptually illustrating example blocks executed to select identifying numbers associated with a UE having multiple subscriber identities such that the paging intervals for the multiple identifying numbers are aligned, in accordance with certain aspects of the present disclosure.

FIG. 6 is a functional block diagram conceptually illustrating example blocks 600 executed to select identifying numbers associated with a UE having multiple subscriber identities such that the paging intervals for the multiple identifying numbers are aligned. Operations illustrated by the blocks 600 may be executed, for example, at the processor(s) 270, 280, and/or 290 of the UE (or the MS 106) from FIG. 2.

The operations may begin, at block 602, by providing a first identifying number (e.g., an IMSI) associated with the UE. For certain aspects, at least a portion of the identifying number may match a phone number for the UE. At block 604, a second identifying number may be selected, such that a first paging interval for the first identifying number is aligned with a second paging interval for the second identifying number. For certain aspects, the second identifying number may be selected such that the first and second paging intervals may be completely aligned. Selection of the second identifying number may be performed, for example, by the UE (e.g., the MS 106), by the BS 104, or by the network. At block 606, the second identifying number may be associated with the MS.

Following the selection and association of the second identifying number, the UE may enter an idle state outside the aligned first and second paging intervals. During the idle state, at least a portion of the UE may be powered down in an effort to conserve battery power. In order to listen for a paging message, the UE may wake up from the idle state, powering up at least some of the components of the UE that were powered down during the idle state. By selecting the second identifying number such that the first and second paging intervals are aligned, the UE may wake up only once during a paging cycle to listen for paging messages for both identifying numbers. Consequently, the UE may spend more time in the idle state, and hence, power consumption may be reduced when compared to a conventional dual-SIM UE where the paging intervals for the first and second identifying numbers are more likely to be offset.

As an example of selecting the second identifying number such that the first and second paging intervals for the first and second identifying numbers are aligned, consider a dual-SIM W-CDMA mobile phone that can be allocated with two IMSIs denoted X and Y. If X and Y are properly selected according to aspects of the present disclosure, then more power may be conserved in idle mode. In order to obtain the same paging interval for listening to paging messages (i.e., the same paging occasion), the two IMSIs X and Y should lead to the same paging offset 410. In other words:

$$SFN(X) \bmod DRX\_Cycle\_Length = SFN(Y) \bmod DRX\_Cycle\_Length \quad (2)$$

where SFN(X) is the SFN in equation (1) with the IMSI=X.

However, the range of parameter K in the real deployed network may most likely be known in advance, which facilitates the solution to equation (2). For example, K can not be more than a maximum value (K≤Kmax). For example, if Kmax=2, then K=1 or 2. Based on this knowledge of the range of K, a solution to equation (2) may be found according to the following equation:

$$(X \operatorname{div} K) \bmod DRX\_Cycle\_Length = (Y \operatorname{div} K) \bmod DRX\_Cycle\_Length \quad (3a)$$

$$\text{and } K \leq Kmax \quad (3b)$$

Assuming the DRX_Cycle_Length to be the maximum=$2^9$=512, the solution to equation (3a) may be:

In case $K=1$: $Y=X+n*512$

In case $K=2$: $Y=X+n*1024$ or $X+n*1024+/-1$

In case $K=3$: $Y=X+n*1536, X+n*1536+/-1,$ or $X+n*1536+/-2$

In case $K=4$: $Y=X+n*2048, X+n*2048+/-1, X+n*2048+/-2,$ or $X+n*2048+/-3$ where the variable n is any integer (positive or negative) to be used for deriving the second IMSI Y from the first IMSI X. Therefore, when the range of K is known, a second IMSI Y may be derived as follows:

In case $Kmax=1$: $Y=X+n*512$

In case $Kmax=2$: $Y=X+n*1024$

In case $Kmax=3$: $Y=X+n*3072$

In case $Kmax=4$: $Y=X+n*6144$

Generalizing these results to any case where the range of K is known, in case $Kmax=L$: $Y=X+n*512*LCM(1, 2, \ldots, L)$ where the LCM $(1, 2, \ldots, L)$, as defined herein, generally refers to the least common multiple (LCM) of the integers 1, 2, ... L. For example, LCM (1, 2, 3, 4)=12. Different relationships between the two different IMSIs X and Y may be derived for alternate DRX_Cycle_Length values (i.e., other than 512).

Typically, the least significant 7 or 8 digits of the IMSI (in the MSIN 306, for example) may be allocated flexibly for the dual IMSIs. If Kmax=2, for example, there can be approximately $10^7/1024 \approx 9800$ or $10^8/1024 \approx 98,000$ second IMSI numbers available in a dual-SIM UE to meet equation (3) above. If the first digit of the remaining seven or eight digits of the IMSI cannot be zero, then there can be about $9 \cdot 10^6/1024 \approx 8800$ or $9 \cdot 10^7/1024 \approx 88,000$ second IMSI numbers available in a dual-SIM UE to meet equation (3) above. In other words, there are several possibilities for selecting Y such that the paging intervals 408 for X and Y are completely aligned.

By selecting a second identifying number in this manner, the paging intervals 504, 506 for both IMSI 1 and IMSI 2 may be completely aligned as illustrated in FIG. 7. During idle mode, the dual-SIM UE may wake up from an idle state to listen for a paging message for either IMSI 1 or IMSI 2 during the aligned paging intervals 504, 506, and the BS 104 may send a paging message during these intervals. By having only a single paging monitoring interval during the paging cycles 500, 502 for IMSI 1 and IMSI 2, the power consumption of a dual-SIM UE may be approximately equal to that of a single-SIM UE during the idle state (and approximately half that of a conventional dual-SIM UE with completely non-aligned paging intervals).

For certain aspects, the paging offset 410 based on X need not exactly equal the paging offset based on Y, unlike equation (3). There may most likely still be a power savings if the two paging intervals 408 derived from X and Y at least partially overlap to a suitable degree for acceptable power savings. In this manner, a greater number of possible IMSIs may be selected for at least partially aligning the paging intervals for the first and second IMSIs.

In one configuration, the apparatus for wireless communication (such as UE with multiple subscriber identities) includes means for providing a first identifying number associated with the UE, means for selecting a second identifying number such that a first paging interval for the first identifying number is aligned with a second paging interval for the second identifying number, and means for associating the second identifying number with the UE. For certain aspects, the apparatus further comprises means for monitoring for a paging message for either the first or the second identifying number during the aligned first and second paging intervals. For certain aspects, the apparatus further comprises means for entering an idle state outside the aligned first and second paging intervals, wherein the means for monitoring for the paging message is configured to wake up from the idle state. In one aspect, the aforementioned means may be the processor(s) 270, 280, and/or 290 configured to perform the functions recited by the aforementioned means. In another aspect, the aforementioned means may be a module or any apparatus configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, various aspects may be extended to other UMTS (Universal Mobile Telecommunications System) systems such as High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), Time-Division Synchronized CDMA (TD-SCDMA), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating in a radio access technology (RAT) network, comprising:
   providing a first identifying number associated with a user equipment device (UE);
   selecting, via a processor, a second identifying number such that a first paging interval for the first identifying number is aligned with a second paging interval for the second identifying number;
   wherein the first identifying number comprises a first International Mobile Subscriber Identity (IMSI) and the second identifying number comprises a second IMSI;
   wherein the first paging interval is based on a first paging offset and the first paging offset is a function of the first IMSI;
   wherein the second paging interval is based on a second paging offset, the second paging offset is the same function of the second IMSI, and the selecting the second identifying number comprises selecting the second IMSI such that the first and second paging offsets are equal;
   wherein the selecting of the second identifying number comprises selecting the second IMSI from one of a plurality of solutions for equation (X div K) mod DRX_Cycle_Length=(Y div K) mod DRX_Cycle_Length, wherein X is the first IMSI, wherein Y is the second IMSI, wherein the DRX_Cycle_Length is a Discontinuous Reception Cycle Length, wherein K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;
   wherein the selecting the second IMSI further comprises selecting the second IMSI according to a relationship based on the first IMSI, the maximum value of K, a least common multiple (LCM) of all values of K, and the DRX_Cycle_Length; and
   associating the second identifying number with the UE, wherein the RAT comprises Universal Mobile Telecommunications System (UMTS).

2. The method of claim 1, wherein the selecting the second identifying number is performed by the UE.

3. The method of claim 1, wherein the relationship is expressed as Y=X+n*512*LCM (1, 2, ..., $K_{max}$), wherein $K_{max}$ is the maximum value of K, wherein LCM (1, 2, ..., $K_{max}$) is the LCM of integers 1, 2, ... $K_{max}$, wherein n is any positive or negative integer, and wherein 512 is the maximum DRX_Cycle_Length.

4. The method of claim 1, further comprising:
   monitoring for a paging message for either the first or the second identifying number during the aligned first and second paging intervals; and
   entering an idle state outside the aligned first and second paging intervals, wherein the monitoring for the paging message comprises waking up from the idle state.

5. The method of claim 1, wherein the selecting of the second identifying number comprises selecting the second identifying number such that the first and second paging intervals are the same.

6. An apparatus for communicating in a network via a radio access technology (RAT), comprising:
   means for providing a first identifying number associated with a user equipment device (UE);
   means for selecting a second identifying number such that a first paging interval for the first identifying number is aligned with a second paging interval for the second identifying number;
   wherein the first paging interval is based on a first paging offset and the first paging offset is a function of the first IMSI;
   wherein the second paging interval is based on a second paging offset, the second paging offset is the same function of the second IMSI, and the selecting the second identifying number comprises selecting the second IMSI such that the first and second paging offsets are equal;
   wherein the means for selecting of the second identifying number is configured to select the second IMSI from one of a plurality of solutions for equation (X div K) mod DRX_Cycle_Length=(Y div K) mod DRX_Cycle_Length, wherein X is the first IMSI, wherein Y is the second IMSI, wherein the DRX_Cycle_Length is a Discontinuous Reception Cycle Length, wherein K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;
   wherein the means for selecting the second IMSI is further configured to select the second IMSI according to a relationship based on the first IMSI, the maximum value of K, a least common multiple (LCM) of all values of K, and the DRX_Cycle_Length; and
   means for associating the second identifying number with the UE, wherein the RAT comprises Universal Mobile Telecommunications System (UMTS).

7. The apparatus of claim 6, wherein the apparatus is the UE.

8. The apparatus of claim 6, wherein the relationship is expressed as Y=X+n*512*LCM (1, 2, ..., $K_{max}$), wherein $K_{max}$ is the maximum value of K, wherein LCM (1, 2, ..., $K_{max}$) is the LCM of integers 1, 2, ... $K_{max}$, wherein n is any positive or negative integer, and wherein 512 is the maximum DRX_Cycle_Length.

9. The apparatus of claim 6, further comprising:
   means for monitoring for a paging message for either the first or the second identifying number during the aligned first and second paging intervals; and.
   means for entering an idle state outside the aligned first and second paging intervals, wherein the monitoring for the paging message comprises waking up from the idle state.

10. The apparatus of claim 6, wherein the means for selecting the second identifying number is configured to select the second identifying number such that the first and second paging intervals are the same.

11. An apparatus for communicating in a network via a radio access technology (RAT), comprising:
   at least one processor adapted to:
       provide a first identifying number associated with a user equipment device (UE);
       select a second identifying number such that a first paging interval for the first identifying number is aligned with a second paging interval for the second identifying number;
       wherein the first paging interval is based on a first paging offset and the first paging offset is a function of the first IMSI;

wherein the second paging interval is based on a second paging offset, the second paging offset is the same function of the second IMSI, and the selecting the second identifying number comprises selecting the second IMSI such that the first and second paging offsets are equal;

wherein the at least one processor is further configured to select the second identifying number by selecting the second IMSI from one of a plurality of solutions for equation (X div K) mod DRX_Cycle$_{Length}$=(Y div K) mod DRX_Cycle_Length, wherein X is the first IMSI, wherein Y is the second IMSI, wherein the DRX_Cycle_Length is a Discontinuous Reception Cycle Length, wherein K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;

wherein the at least one processor is further configured to select the second IMSI by selecting the second IMSI according to a relationship based on the first IMSI, the maximum value of K, a least common multiple (LCM) of all values of K, and the DRX_Cycle_Length; and associate the second identifying number with the UE, wherein the RAT comprises Universal Mobile Telecommunications System (UMTS); and a memory coupled to the at least one processor.

12. The apparatus of claim 11, wherein the apparatus is the UE.

13. The apparatus of claim 11, wherein the relationship is expressed as Y=X+n*512*LCM (1, 2, . . . , K$_{max}$), wherein K$_{max}$ is the maximum value of K, wherein LCM (1, 2, . . . , K$_{max}$) is the LCM of integers 1, 2, . . . K$_{max}$, wherein n is any positive or negative integer, and wherein 512 is the maximum DRX_Cycle_Length.

14. The apparatus of claim 11, wherein the at least one processor is further configured to:
monitor for a paging message for either the first or the second identifying number during the aligned first and second paging intervals; and
enter an idle state outside the aligned first and second paging intervals, wherein the monitoring for the paging message comprises waking up from the idle state.

15. The apparatus of claim 11, wherein the at least one processor is configured to select the second identifying number such that the first and second paging intervals are the same.

16. A computer-program product for communicating in a network via a radio access technology (RAT), the computer-program product comprising:
a non-transitory computer-readable medium comprising code for:
providing a first identifying number associated with a user equipment device (UE);
selecting a second identifying number such that a first paging interval for the first identifying number is aligned with a second paging interval for the second identifying number;
wherein the first identifying number comprises a first International Mobile Subscriber Identity (IMSI) and the second identifying number comprises a second IMSI;

wherein the first paging interval is based on a first paging offset and the first paging offset is a function of the first IMSI;

wherein the second paging interval is based on a second paging offset, the second paging offset is the same function of the second IMSI, and the selecting the second identifying number comprises selecting the second IMSI such that the first and second paging offsets are equal;

wherein the selecting of the second identifying number comprises selecting the second IMSI from one of a plurality of solutions for equation (X div K) mod DRX_Cycle_Length=(Y div K) mod DRX_Cycle_Length, wherein X is the first IMSI, wherein Y is the second IMSI, wherein the DRX_Cycle_Length is a Discontinuous Reception Cycle Length, wherein K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;

wherein the selecting the second IMSI further comprises selecting the second IMSI according to a relationship based on the first IMSI, the maximum value of K, a least common multiple (LCM) of all values of K, and the DRX_Cycle_Length; and associating the second identifying number with the UE, wherein the RAT comprises Universal Mobile Telecommunications System (UMTS).

17. The computer-program product of claim 16, wherein the selecting the second identifying number is performed by the UE.

18. The computer-program product of claim 16, wherein the relationship is expressed as Y=X+n*512*LCM (1, 2, . . . , K$_{max}$), wherein K$_{max}$ is the maximum value of K, wherein LCM (1, 2, . . . , K$_{max}$) is the LCM of integers 1, 2, . . . K$_{max}$, wherein n is any positive or negative integer, and wherein 512 is the maximum DRX_Cycle_Length.

19. The computer-program product of claim 16, further comprising code for:
monitoring for a paging message for either the first or the second identifying number during the aligned first and second paging intervals; and
entering an idle state outside the aligned first and second paging intervals, wherein the monitoring for the paging message comprises waking up from the idle state.

20. The computer-program product of claim 16, wherein the selecting of the second identifying number comprises selecting the second identifying number such that the first and second paging intervals are the same.

21. A method, comprising:
performing by a processor, selecting identifying numbers associated with a user equipment device (UE) in a Universal Mobile Telecommunications System (UMTS) network, the selecting comprising:
providing a first identifying number comprising a first International Mobile Subscriber Number (IMSI) associated with the UE;
selecting a second identifying number comprising a second IMSI for the UE such that a first paging interval for the first identifying number is at least partially overlapping the first paging interval with a second paging interval for the second identifying number, wherein:

the first paging interval is based on a first paging offset that is a function of the first IMSI;

the second paging interval is based on a second paging offset that is a function of the second IMSI; and the first paging offset and the second paging offset are determined based on a discontinuous reception (DRX) cycle length;

wherein, the selecting of the second identifying number comprises, selecting by the processor, the second IMSI such that the first and second paging offsets are equal;

wherein the selecting of the second identifying number comprises selecting, by the processor, the second IMSI from one of a plurality of solutions for equation (X div K) mod DRX_Cycle_Length=(Y div K) mod DRX_Cycle_Length, where X is the first IMSI, Y is the second IMSI, DRX_Cycle_Length is the DRX Cycle Length, K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;

wherein the selecting the second IMSI further comprises selecting the second IMSI according to a relationship based on the first IMSI, the maximum value of K, a least common multiple (LCM) of all values of K, and the DRX_Cycle_Length; and associating the second identifying number with the UE.

22. The method according to claim 21, wherein, for circuit-switched service, the DRX cycle length is determined by the UMTS network.

23. The method according to claim 21, wherein, for packet switched service, the DRX cycle length is determined based on negotiation between the UMTS network and the UE.

24. The method according to claim 21, wherein, a greater number of possible IMSIs are selectable utilizing the at least partial overlapping with the second paging interval as compared with complete overlapping of the first paging interval with the second paging interval.

25. The method of claim 21, comprising monitoring, by the processor, for paging messages for either the first identifying number or the second identifying number during the at least partial overlapping of the first paging interval and the second paging interval.

26. The method of claim 25, comprising entering, by the processor, an idle state outside the aligned first and second paging intervals, wherein the monitoring for the paging messages comprises waking up from the idle state.

27. The method of claim 21, wherein the relationship is expressed as Y=X+n*512*LCM (1, 2, . . . , $K_{max}$), wherein $K_{max}$ is the maximum value of K, wherein LCM 1, 2, . . . , $K_{max}$) is the LCM of integers 1, 2, . . . $K_{max}$, wherein n is any positive or negative integer, and wherein 512 is the maximum DRX_Cycle_Length.

28. An apparatus, comprising:
means for selecting identifying numbers associated with a user equipment device (UE) in a Universal Mobile Telecommunications System (UMTS) network, the means for selecting is operable to:
provide a first identifying number comprising a first International Mobile Subscriber Number (IMSI) associated with the UE;
select a second identifying number comprising a second IMSI for the UE such that a first paging interval for the first identifying number is at least partially overlapping the first paging interval with a second paging interval for the second identifying number, wherein:

the first paging interval is based on a first paging offset that is a function of the first IMSI;

the second paging interval is based on a second paging offset that is a function of the second IMSI; and the first paging offset and the second paging offset are determined based on a discontinuous reception (DRX) cycle length;

wherein the means for selecting is operable to monitor for paging messages for either the first identifying number or the second identifying number during the at least partial overlapping of the first paging interval and the second paging interval;

wherein the means for selecting is operable to enter an idle state outside the aligned first and second paging intervals, wherein the monitoring for the paging messages comprises waking up from the idle state;

wherein, the means for selecting the second identifying number is operable to select the second IMSI such that the first and second paging offsets are equal;

wherein the means for selecting of the second identifying number is operable to select the second IMSI from one of a plurality of solutions for equation (X div K) mod DRX_Cycle_Length=(Y div K) mod DRX_Cycle_Length, where X is the first IMSI, Y is the second IMSI, DRX_Cycle_Length is the DRX Cycle Length, K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;

wherein the means for selecting the second IMSI further is operable to select the second IMSI according to a relationship based on the first IMSI, the maximum value of K, a least common multiple (LCM) of all values of K, and the DRX_Cycle_Length; and associate the second identifying number with the UE.

29. The apparatus according to claim 28, wherein, for circuit-switched service, the DRX cycle length is determined by the UMTS network.

30. The apparatus according to claim 28, wherein, for packet switched service, the DRX cycle length is determined based on negotiation between the UMTS network and the UE.

31. The apparatus according to claim 28, wherein, a greater number of possible IMSIs are selectable utilizing the at least partial overlapping with the second paging interval as compared with complete overlapping of the first paging interval with the second paging interval.

32. The method of claim 28, wherein the relationship is expressed as Y=X+n*512*LCM (1, 2,. . . , $K_{max}$), wherein $K_{max}$ is the maximum value of K, wherein LCM (1, 2, . . . , $K_{max}$) is the LCM of integers 1, 2, . . . $K_{max}$, wherein n is any positive or negative integer, and wherein 512 is the maximum DRX_Cycle_Length.

33. An apparatus, comprising:
at least one processor operable to perform selecting identifying numbers associated with a user equipment device (UE) in a Universal Mobile Telecommunications System (UMTS) network; and
a memory coupled to the at least one processor; and wherein the at least one processor is operable to:
provide a first identifying number comprising a first International Mobile Subscriber Number (IMSI) associated with the UE;
select a second identifying number comprising a second IMSI for the UE such that a first paging interval for the first identifying number is at least partially overlapping the first paging interval with a second paging interval for the second identifying number, wherein:
the first paging interval is based on a first paging offset that is a function of the first IMSI;
the second paging interval is based on a second paging offset that is a function of the second IMSI; and
the first paging offset and the second paging offset are determined based on a discontinuous reception (DRX) cycle length;
wherein, for the selecting of the second identifying number, the at least one processor is operable to select the second IMSI such that the first and second paging offsets are equal;
wherein, for the selecting of the second identifying number, the at least one processor is operable to select the second IMSI from one of a plurality of solutions for equation (X div K) mod DRX_Cycle_Length=(Y div K) mod DRX_Cycle_Length, where X is the first IMSI, Y is the second IMSI, DRX_Cycle_Length is the DRX Cycle Length, K is a number of Secondary Common Control Physical Channels (SCCPCHs) configured for a cell, wherein X div K is the quotient of X divided by K, wherein Y div K is the quotient of Y divided by K, wherein (X div K) mod DRX_Cycle_Length equals the first paging offset, and wherein (Y div K) mod DRX_Cycle_Length equals the second paging offset;
wherein, for the selecting of the second identifying number, the at least one processor is operable to select the second IMSI according to a relationship based on the first IMSI, the maximum value of K, a least common multiple (LCM) of all values of K, and the DRX_Cycle_Length; and
associate the second identifying number with the UE.

34. The apparatus according to claim 33, wherein, for circuit-switched service, the DRX cycle length is determined by the UMTS network.

35. The apparatus according to claim 33, wherein, for packet switched service, the DRX cycle length is determined based on negotiation between the UMTS network and the UE.

36. The apparatus according to claim 33, wherein, a greater number of possible IMSIs are selectable utilizing the at least partial overlapping with the second paging interval as compared with complete overlapping of the first paging interval with the second paging interval.

37. The apparatus of claim 33, wherein the at least one processor is operable to monitor for paging messages for either the first identifying number or the second identifying number during the at least partial overlapping of the first paging interval and the second paging interval.

38. The apparatus of claim 37, wherein the at least one processor is operable to enter an idle state outside the aligned first and second paging intervals, wherein the monitoring for the paging messages comprises waking up from the idle state.

39. The apparatus of claim 33, wherein the relationship is expressed as $Y=X+n*512*LCM(1, 2, \ldots, K_{min})$, wherein $K_{max}$ is the maximum value of K, wherein LCM $(1, 2, \ldots, K_{max})$ is the LCM of integers $1, 2, \ldots K_{max}$, wherein n is any positive or negative integer, and wherein 512 is the maximum DRX_Cycle_Length.

* * * * *